Dec. 26, 1961  N. W. HORN ETAL  3,014,623
MOTOR AND PUMP MOUNTING MEANS
Filed Jan. 29, 1958  2 Sheets-Sheet 1

Inventors:
Norbert W. Horn and
Delbert S. Oliver
By: Frank C. Parker Atty.

Dec. 26, 1961  N. W. HORN ETAL  3,014,623
MOTOR AND PUMP MOUNTING MEANS
Filed Jan. 29, 1958  2 Sheets-Sheet 2
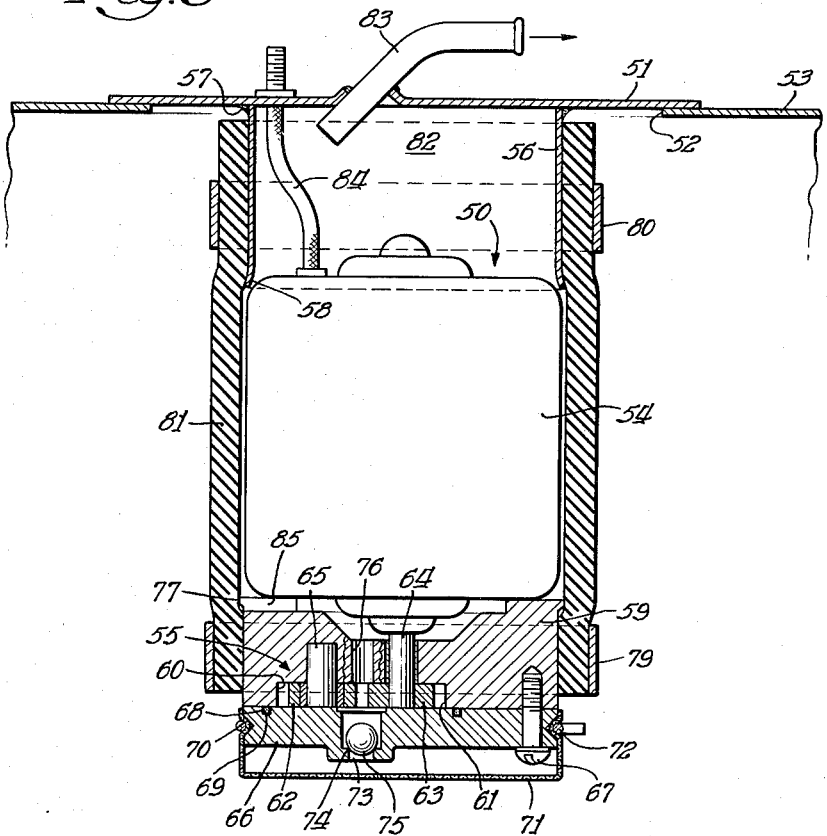
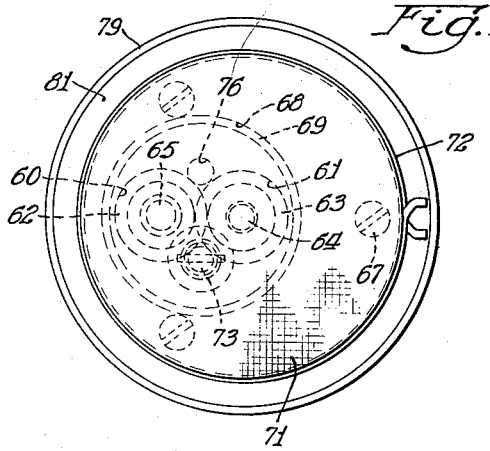
Inventors:
Norbert W. Horn and
Delbert S. Oliver
By: Frank C. Parker Atty.

United States Patent Office 3,014,623
Patented Dec. 26, 1961

3,014,623
MOTOR AND PUMP MOUNTING MEANS
Norbert W. Horn and Delbert S. Oliver, Wooster, Ohio, assignors to Borg-Warner Corporation, Chicago, Ill., a corporation of Illinois
Filed Jan. 29, 1958, Ser. No. 711,915
10 Claims. (Cl. 222—189)

The present invention relates in general to mounting devices for a combined pump and motor assembly and is more particularly concerned with means for mounting a pump and motor assembly within a liquid storage tank wherein the pump and motor assembly is adapted to pump liquid out of the storage tank.

The present invention comprises an improvement over the invention disclosed in the co-pending application of H. I. Schroeder, Serial No. 711,914, filed January 29, 1958, now abandoned, which application discloses a pump and motor assembly suspended within a liquid storage tank by means of a flexible sleeve member respectively fastened to the upper wall of the storage tank and to the pump and motor assembly housing.

The present invention contemplates the provision of a liquid seal between the sleeve member and a projecting portion on the liquid storage tank and between the sleeve member and the pump and motor housing for providing an accumulator effective to dampen pressure surges in the liquid caused by the operation of the pump.

The present invention, therefore, has as its principal object the provision of a simple mounting means for mounting a pump and motor assembly within a liquid storage tank, which mounting means confines vibrations of the motor to the pump and motor assembly itself and which mounting means also provides an accumulator device for liquid drawn from the tank by the pump in order to dampen pressure surges normally imparted to the liquid by the pump.

The present invention is particularly suitable as a mounting means for a pump and motor assembly adapted to be disposed within a liquid fuel storage tank such as may be used in automobiles, for example, and by utilizing the mounting sleeve itself as a liquid accumulator the entire assembly is made more explosive resistant.

A further object of the present invention is to provide a check valve in association with the pump inlet and outlet for enabling the constant maintenance of a pressure head within the accumulator. This also minimizes the danger of explosion at all times except possibly when the pump is being initially primed.

A primary advantage of the present pump and motor assembly is its simplicity and compactness which facilitates mounting the same within a liquid storage tank.

The foregoing objects and advantages of the present invention will become more apparent and additional objects and advantages of the invention will also become apparent from the following detailed description wherein:

FIG. 3 is a side elevational view shown partly in section and illustrating a second embodiment of the invention; and FIG. 4 is a bottom view of the embodiment disclosed in FIG. 3.

Figure 1:
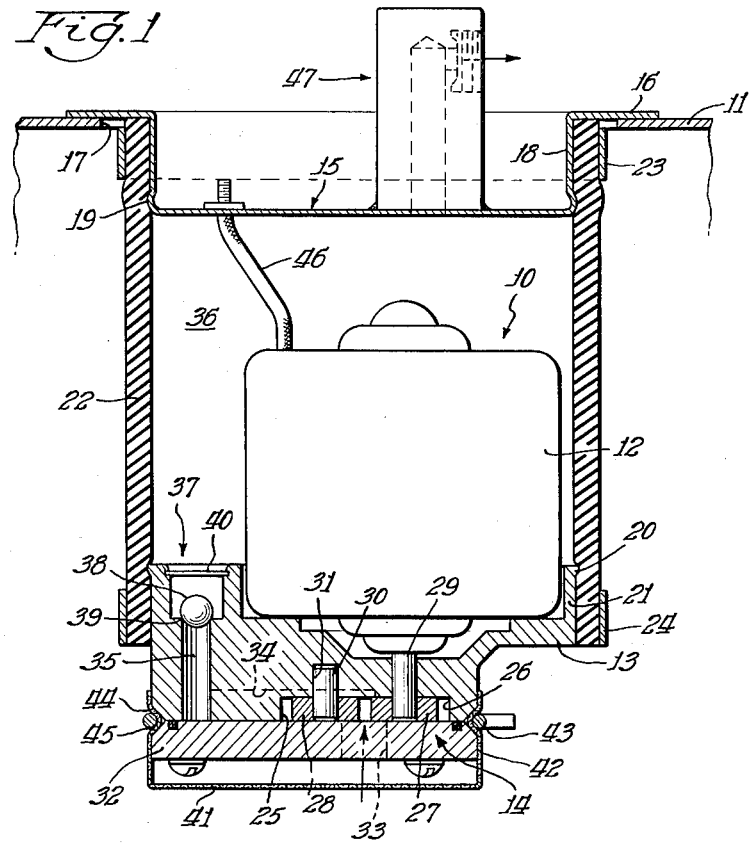
FIG. 1 is a side elevational view, shown partly in section, and illustrating one embodiment of the invention.
Figure 2:
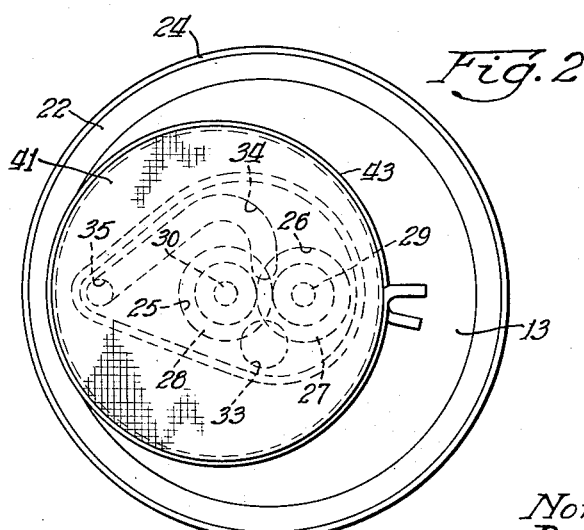
FIG. 2 is a bottom view of the embodiment shown in FIG. 1.

With reference to the drawings, wherein like reference numerals in the different views identify identical parts, and referring first to the embodiment of the invention disclosed in FIGS. 1 and 2, the pump and motor assembly, indicated generally by reference numeral 10, is adapted to be mounted within a liquid storage tank, only the top wall 11 of which is illustrated. The pump and motor assembly 10 comprises an electric motor 12, the housing of which is substantially integrally secured to a housing 13 within which a pump 14 is disposed.

The entire pump and motor assembly 10 is adapted to be secured to a mounting plate 15, or could be directly secured to the wall 11 of the tank by merely forming the wall 11 to the same configuration as the mounting member or plate 15. It is to be understood that the mounting plate 15 can be considered as a continuation of the wall 11 itself. The mounting plate 15 has a peripheral and radially extending flange 16 adapted to fit over an opening 17 formed in the tank wall 11. The mounting plate 15 also includes a substantially cylindrically shaped flange portion 18 which terminates at its inner end with a radially outwardly projecting rib or projection 19. The pump and motor housing member 13 is similarly formed with a radially outwardly extending peripheral rib or projection 20 which forms the upper terminus of a cylindrical portion 21. A flexible, preferably rubber, sleeve member 22 has its opposed ends respectively disposed around the cylindrical mounting member 18 and around the cylindrical mounting portion 21 of the housing 13. A pair of clamping bands 23 and 24 which are tightly drawn around the sleeve 22 respectively establish a liquid seal between the sleeve 22 and the plate 15 and between the sleeve 22 and the housing 13. The sleeve 22, plate 15 and housing 13 together comprise a liquid accumulator as well as providing a receptacle for receiving the motor 12.

The housing member 13 is cut away in the form of two intersecting cylindrical chambers 25 and 26 within which are disposed a pair of intermeshing pump gears 27 and 28 of well known construction. The pump gear 27 is the driving pump gear and is directly mounted on a driving shaft 29 of motor 12. The pump gear 28 is rotatably mounted on a short mounting shaft 30 received within a mounting aperture 31 formed in housing 13. A cover plate 32 is disposed on the bottom side of the housing 13 in order to effectively seal the pumping cavities 25 and 26. An inlet passage 33 leading to the pumping cavities 25 and 26 communicates directly with the interior of the storage tank and an outlet passage 34 communicates with a drilled aperture 35 in housing 13 and leads to the accumulator designated by reference numeral 36. A check valve 37 comprising a ball 38 disposed on a seat 39 is mounted at the upper end of aperture 35 and held in place by means of a metal strip 40 for insuring that the check valve will always be in a position to function.

A filter or strainer for filtering out any foreign matter which may be in the storage tank is provided and comprises a screen 41 which is formed with a cylindrically extending flange 42 and held in place by means of a tight band or wire 43 adapted to be seated within a groove formed by the chamfered edges 44 and 45 at the peripheries of the abutting faces of the housing 13 and cover plate 32.

The motor 12 is provided with a pair of electrical lead-in wires represented by reference numeral 46 which extend through mounting plate 15 for easy connection with leads from any suitable source of electrical current.

The mounting plate 15 may also be provided with any suitable liquid outlet 47 which may be connected with the mounting plate 15 in any desirable manner.

It will be understood that the motor 12 is encased in a substantially liquid proof casing in order to minimize the danger of explosion due to a volatile fuel getting inside the motor casing.

In the operation of the pump and motor assembly shown in FIGS. 1 and 2, it will be understood that the mounting plate 15, which may comprise an integral part of the tank wall 11 or may cover an opening 17 and be sealed with respect to the wall 11, will preferably be mounted so that the pump and motor assembly 10 will suspend therefrom with the screen or filter 41 disposed substantially at the bottom of the storage tank. Upon rotation of the motor 12 the pump 14 draws liquid through pump inlet 33 and forces it into the accumulator 36 through outlet 34—35, the check valve 38 functioning to permit the fuel or other liquid to pass into the accumulator 36. The pressurized liquid then escapes from the accumulator 36 through outlet 47 to the point where the liquid is being utilized. The flexible sleeve 22 minimizes vibration caused by the rotating motor and pump assembly 10 and together with the mounting plate 15 and housing portion 13 forms the accumulator 36 for receiving the liquid.

The second embodiment of the present invention is similar in most respects to the embodiment disclosed in FIGS. 1 and 2 and a detailed description of this form of the invention will now be given. A pump and motor assembly 50 suspended by a mounting plate 51 adapted to be disposed over an opening 52 in a wall 53 of a tank, not otherwise shown, comprises a motor 54 and a pump 55. The mounting plate 51 could just as well comprise an integral part of wall 53, but for purposes of illustration, has been shown as a separate member and it will be understood that the mounting plate 51 will be disposed in sealed relationship, such as by welding, to the wall 53. The mounting plate 51 is formed with a substantially cylindrical mounting member 56 welded thereto, as indicated at 57, the cylindrical member 56 terminating in a radially outwardly extending peripheral projection or rib 58.

The pump and motor assembly 50 includes a pump housing 59 formed with a pair of intersecting substantially cylindrical cavities 60 and 61 for respectively receiving pumping gears 62 and 63. The pumping gear 63 comprises the driving pump gear and is fixed on drive shaft 64 of motor 54. The driving pump gear 63 meshes with driven pump gear 62 which is rotatable with or on a mounting shaft 65 disposed within a suitable aperture in pump housing 59. A cover plate 66 is provided for the pump housing 59, being held thereagainst by a plurality of bolts 67 and there being a suitable annular groove 68 formed in the cover plate 66 for receiving an O-ring 69 which effectively seals the cover plate 66 relative to the pump housing 59. The cover plate 66 is formed with a peripheral V-shaped groove 70 and a filter screen or strainer 71 disposed around the cover plate 66 is held fixed with respect thereto by means of an encompassing band or ring 72.

The cover plate 66 is formed with a pump inlet 73 having a suitable valve seat 74 for receiving a ball check 75 and permitting the pump gears 62 and 63 to draw liquid from the tank within which the motor and pump assembly 50 are disposed. The pump housing 59 is formed with a liquid outlet or pump outlet 76 leading through the pump housing 59.

The pump housing 59 is formed with an annular peripheral projection or rib 77 and the rib 77, together with rib 58, functions in conjunction with a pair of encompassing clamping bands 79 and 80 which surround a flexible mounting hose member 81, disposed around mounting member 56 and housing member 59 in order to effect a seal between the hose member 81, mounting member 56 and housing member 59. The cover plate 51, mounting member 56, flexible hose member 81 and pump housing 59 together comprise a cavity forming an accumulator 82 for storing a quantity of liquid pumped thereinto by the pump 62—63. A suitable outlet 83 extending through cover plate 51 may be connected with a suitable conduit for conveying liquid out of accumulator 82 to the point where it is being utilized. Electrical leads extending to motor 54 are designated by reference numeral 84 and extend through the cover plate 51, as shown.

In the operation of the motor and pump assembly 50 shown in FIGS. 3 and 4, the motor 54 drives the pump 62—63 and the latter draws liquid from within the tank through the filter screen 71 and through inlet 73, which is permitted by the ball check valve 75, and pumps the liquid through pump outlet 76 into the space immediately beneath the motor 54. A plurality of radial openings 85 permit the liquid to reach the accumulator 82 from whence it may be withdrawn as needed through accumulator outlet 83.

The ball check valves provided in both embodiments of the invention enable the pump and motor assemblies to establish a pressure head within the accumulator and each of the accumulators is effective to minimize pressure surges in the liquid normally induced by the operation of the pumps. Further, by disposing the motors entirely within the accumulators, the quantity of liquid within the accumulators surrounds the motors and functions in a manner which effectively cools the motors during operation thereof. By providing the ball check valves, a quantity of liquid may be maintained within the accumulators at all times except when the pumps are being initially primed and this is effective in minimizing the dangers from explosion which otherwise could readily occur when the assembly is used as a pumping device for handling explosive liquids.

The simplicity of the forms of the invention disclosed herein contribute to the economy of manufacture thereof. By utilizing a flexible member for not only mounting the assembly but also for serving as an accumulator for the liquid pumped by the pumping assembly, a thoroughly practical combined motor and pump assembly is provided.

It is contemplated that numerous changes and modifications may be made in the present invention without departing from the spirit or scope thereof.

What is claimed is:

1. A combined pump and motor assembly adapted for mounting within a liquid supply tank and comprising a mounting member projecting inwardly from a wall of the tank, said pump and motor assembly being substantially rigidly interconnected and including a housing having a mounting portion, said pump having an inlet and an outlet, a flexible enclosing means sealingly engaged at its opposite ends with said mounting member and with said mounting portion to support said pump such that said inlet is in communication within said tank and to form a pressure accumulator in communication with said outlet, an outlet extending from within said pressure accumulator through said mounting member, and means to energize said motor.

2. A combined pump and motor assembly adapted for mounting within a liquid supply tank and comprising a mounting member projecting inwardly from a wall of the tank, said pump and motor assembly being substantially rigidly interconnected and including a housing having a mounting portion, flexible enclosing means respectively sealingly engaged at its opposite ends with said mounting member and with said mounting portion to support said housing from said mounting member and together with the mounting member and housing forming an accumulator for a quantity of liquid normally discharged from said pump, said pump including a liquid inlet adapted to communicate with a supply of liquid in the tank and a liquid outlet in communication with the interior of said accumulator, check valve means permitting said pump to draw liquid through the inlet and pump it into said accumulator through said outlet, and an outlet for said tank for conveying liquid out of the accumulator.

3. In combination with a liquid supply tank, means projecting inwardly from a wall of said tank and forming a mounting member, a liquid pump including a housing, a driving motor for said pump substantially rigidly secured to said pump housing, flexible means having opposed ends respectively disposed in encompassing sealing relation around said mounting member and around said pump housing to flexibly support said housing from said mounting member and together with said mounting member and housing defining an accumulator, and said pump housing including means defining liquid inlet and outlet means respectively adapted to communicate with liquid in said supply tank and with the interior of said accumulator for enabling the pump to draw liquid from the tank and pump it into the accumulator, and means to remove fluid from said accumulator.

4. In combination with a liquid supply tank, means projecting inwardly from a wall of said tank and forming a mounting member, a liquid pump including a housing, a driving motor for said pump substantially rigidly secured to said pump housing, flexible means having opposed ends respectively disposed in encompassing relation around said mounting member and around said pump housing, clamping means disposed around said flexible means for respectively effectively sealing the latter with respect to said mounting member and housing, said flexible means effective to support said housing from said mounting member, and said flexible means, said mounting member and housing together defining an accumulator and said pump housing including means defining liquid inlet and outlet means respectively adapted to communicate with liquid in said supply tank and with the interior of said accumulator for enabling the pump to draw liquid from the tank and pump it into the accumulator, and an outlet extending through said wall communicating with said accumulator.

5. In combination with a liquid supply tank, means projecting inwardly from a wall of said tank, and forming a mounting member, a liquid pump including a housing, a driving motor for said pump substantially rigidly secured to said pump housing, flexible means having opposed ends respectively disposed in encompassing sealing relation around said mounting member and around said pump housing and together with said mounting member and housing defining an accumulator and defining means for supporting said housing from said mounting member, said pump housing including means defining liquid inlet and outlet means including check valve means and respectively adapted to communicate with liquid in said supply tank and with the interior of said accumulator for enabling the pump to draw liquid from the tank and pump it into the accumulator, and an outlet means communicating with said accumulator.

6. In combination with a liquid container initially formed with an opening therein, a cover plate for said opening including generally cylindrically shaped mounting means formed as an integral part thereof, said mounting means terminating with a peripherally extending projection, a motor and liquid pump assembly interconnected with each other and including a housing portion having a generally peripherally extending projection, means comprising a flexible sleeve having its opposed ends respectively disposed about said cover plate mounting means and said housing portion, clamping bands respectively disposed around said sleeve opposite the cover plate mounting means and opposite the housing portion and cooperating with the peripherally extending projections to substantially effectively provide a seal between the sleeve and the cover plate mounting means and motor and pump housing portion and thereby provide a liquid accumulator, said housing portion being supported from said cover plate mounting means by said flexible sleeve, means providing a liquid inlet for the pump adapted to communicate with a supply of liquid in the container, and means providing a liquid outlet for the pump in communication with the interior of the accumulator, whereby the pump can draw liquid from the container through the inlet and pump it into the accumulator through the outlet.

7. In combination with a liquid container initially formed with an opening therein, a cover plate for said opening including generally cylindrically shaped mounting means formed as an integral part thereof, said mounting means terminating with a peripherally extending projection, a motor and liquid pump assembly interconnected with each other and including a housing portion having a generally peripherally extending projection, means comprising a flexible sleeve having its opposed ends respectively disposed about said cover plate mounting means and said housing portion, clamping bands respectively disposed around said sleeve opposite the cover plate mounting means and opposite the housing portion and cooperating with the peripherally extending projections to substantially effectively provide a seal between the sleeve and the cover plate mounting means and motor and pump housing portion and thereby provide a liquid accumulator, said housing portion being supported from said cover plate mounting means by said flexible sleeve, means providing a liquid inlet for the pump adapted to communicate with a supply of liquid in the container, means providing a liquid outlet for the pump in communication with the interior of the accumulator, whereby the pump can draw liquid from the container through the inlet and pump it into the accumulator through the outlet; and filter means disposed over said inlet to prevent the pump from pumping foreign matter in the container into the accumulator.

8. In combination with a liquid container initially formed with an opening therein, a cover plate for said opening including generally cylindrically shaped mounting means formed as an integral part thereof, said mounting means terminating with a peripherally extending projection, a motor and liquid pump assembly interconnected with each other and including a housing portion having a generally peripherally extending projection, means comprising a flexible sleeve having its opposed ends respectively disposed about said cover plate mounting means and said housing portion, clamping bands respectively disposed around said sleeve opposite the cover plate mounting means and opposite the housing portion and cooperating with the peripherally extending projections to substantially effectively provide a seal between the sleeve and the cover plate mounting means and motor and pump housing portion and thereby provide a liquid accumulator, said housing portion being supported from said cover plate mounting means by said flexible sleeve, means providing a liquid inlet for the pump adapted to communicate with a supply of liquid in the container, means providing a liquid outlet for the pump in communication with the interior of the accumulator, and means forming a liquid outlet for the accumulator whereby the pump can draw liquid from the container through the inlet and pump it into the accumulator through the pump outlet, the accumulator functioning to dampen pressure surges in the liquid before it leaves through the accumulator outlet.

9. In combination with a liquid container initially formed with an opening therein, a cover plate for said opening including generally cylindrically shaped mounting means formed as an integral part thereof, said mounting means terminating with a peripherally extending projection, a motor and liquid pump assembly interconnected with each other and including a housing portion having a generally peripherally extending projection, means comprising a flexible sleeve having its opposed ends respectively disposed about said cover plate mounting means and said housing portion, clamping bands respectively disposed around said sleeve opposite the cover plate mounting means and opposite the housing portion and cooperating with the peripherally extending projections to substantially effectively provide a seal between the sleeve and the cover plate mounting means and motor and pump housing portion and thereby provide a liquid accumulator, said housing portion being supported from said cover plate mounting means by said flexible sleeve, means providing a liquid inlet for the pump adapted to communicate with a supply of liquid in the container, means providing a liquid outlet for the pump in communication with the interior of the accumulator, means forming a liquid outlet for the accumulator, and means providing a check valve for the pump whereby the pump can draw liquid from the container through the inlet and pump it into the accumulator through the pump outlet, the check valve enabling the pump to pressurize the liquid in the accumulator and the accumulator functioning to dampen pressure surges in the liquid before it leaves through the accumulator outlet.

10. In combination with a liquid container initially formed with an opening therein, a cover plate for said opening including generally cylindrically shaped mounting means formed as an integral part thereof, said mounting means terminating with a peripherally extending projection, a motor and liquid pump assembly interconnected with each other and including a housing portion having a generally peripherally extending projection, means comprising a flexible sleeve having its opposed ends respectively disposed about said cover plate mounting means and said housing portion, clamping bands respectively disposed around said sleeve opposite the cover plate mounting means and opposite the housing portion and cooperating with the peripherally extending projections to substantially effectively provide a seal between the sleeve and the cover plate mounting means and motor and pump housing portion and thereby provide a liquid accumulator, said housing portion being supported from said cover plate mounting means by said flexible sleeve, means providing a liquid inlet for the pump adapted to communicate with a supply of liquid in the container, means providing a liquid outlet for the pump in communication with the interior of the accumulator, means forming a liquid outlet for the accumulator, said pump including a cover disposed in sealing relation to said housing portion, and means providing a check valve in said pump inlet whereby the pump can draw liquid from the container through the inlet and pump it into the accumulator through the pump outlet, the check valve retaining pressurized liquid in the accumulator and the accumulator functioning to dampen pressure surges in the liquid before it leaves through the accumulator outlet.

References Cited in the file of this patent

UNITED STATES PATENTS

| | | |
|---|---|---|
| 2,139,370 | Lauer et al. | Dec. 6, 1938 |
| 2,370,590 | Taylor | Feb. 27, 1945 |
| 2,394,154 | Curtis et al. | Feb. 5, 1946 |
| 2,413,546 | Curtis et al. | Dec. 31, 1946 |
| 2,492,141 | Gaylord | Dec. 27, 1949 |
| 2,533,428 | Carpenter | Dec. 12, 1950 |
| 2,649,049 | Pezzillo et al. | Aug. 18, 1953 |
| 2,672,821 | Montgomery | Mar. 23, 1954 |
| 2,695,565 | Seinfeld | Nov. 30, 1954 |
| 2,695,694 | Seinfeld | Nov. 30, 1954 |
| 2,699,907 | Smith et al. | Jan. 18, 1955 |
| 2,726,682 | Conroy et al. | Dec. 13, 1955 |
| 2,801,592 | Barton | Aug. 6, 1957 |
| 2,807,395 | Korte | Sept. 27, 1957 |